United States Patent
Park

(10) Patent No.: US 8,116,707 B2
(45) Date of Patent: Feb. 14, 2012

(54) BROADCASTING RECEIVER AND OPERATING METHOD THEREOF

(75) Inventor: Kwang Jae Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 266 days.

(21) Appl. No.: 12/441,931

(22) PCT Filed: Jan. 18, 2008

(86) PCT No.: PCT/KR2008/000333
§ 371 (c)(1), (2), (4) Date: Mar. 19, 2009

(87) PCT Pub. No.: WO2008/093949
PCT Pub. Date: Aug. 7, 2008

(65) Prior Publication Data
US 2009/0280761 A1    Nov. 12, 2009

(30) Foreign Application Priority Data
Jan. 29, 2007    (KR) .................. 10-2007-0008851

(51) Int. Cl.
*H04B 1/18* (2006.01)
(52) U.S. Cl. .................. 455/182.2; 455/192.1
(58) Field of Classification Search .................. None
See application file for complete search history.

(56) References Cited

U.S. PATENT DOCUMENTS

| 4,709,406 | A  | * | 11/1987 | Omoto .................. 455/208 |
| 6,043,720 | A  |   | 3/2000  | Van Veenendaal et al. |
| 7,113,751 | B2 | * | 9/2006  | Barak .................. 455/76 |
| 7,221,917 | B2 | * | 5/2007  | Kroeger .................. 455/192.2 |
| 7,869,779 | B2 | * | 1/2011  | Walley et al. .................. 455/161.3 |
| 2003/0043947 | A1 | * | 3/2003 | Zehavi et al. .................. 375/365 |
| 2003/0112080 | A1 |   | 6/2003 | Amiot et al. |

FOREIGN PATENT DOCUMENTS
WO    WO 2004/107568    12/2004

OTHER PUBLICATIONS

Hua, X. & Yueke, L. (2003). Correction of LNB Local Oscillation Frequency Offset. China Cable Television. 21: 102-103.
Deng, Y. (2003). Design and Implementation of Digital Demodulation in DVB-S Receiving Chip. Mater Thesis of Zhejiang University, China Excellent Master Thesis.
Office Action dated Sep. 27, 2010 in Chinese Application No. 200880000865.0, filed Jan. 18, 2008.

\* cited by examiner

*Primary Examiner* — Cassandra Cox
(74) *Attorney, Agent, or Firm* — Saliwanchik, Lloyd & Eisenschenk

(57) ABSTRACT

Disclosed is a broadcasting receiver. The broadcasting receiver comprises a low noise block down converter outputting a signal by amplifying a received signal, a tuner tuning a plurality of broadcasting channels based on the signals output from the low noise block down converter, and a frequency drift detector detecting frequency drifts of the broadcasting channels tuned by the tuner, and correcting oscillation frequencies of at least one of the low noise block down converter and the tuner.

12 Claims, 1 Drawing Sheet

[Fig. 1]
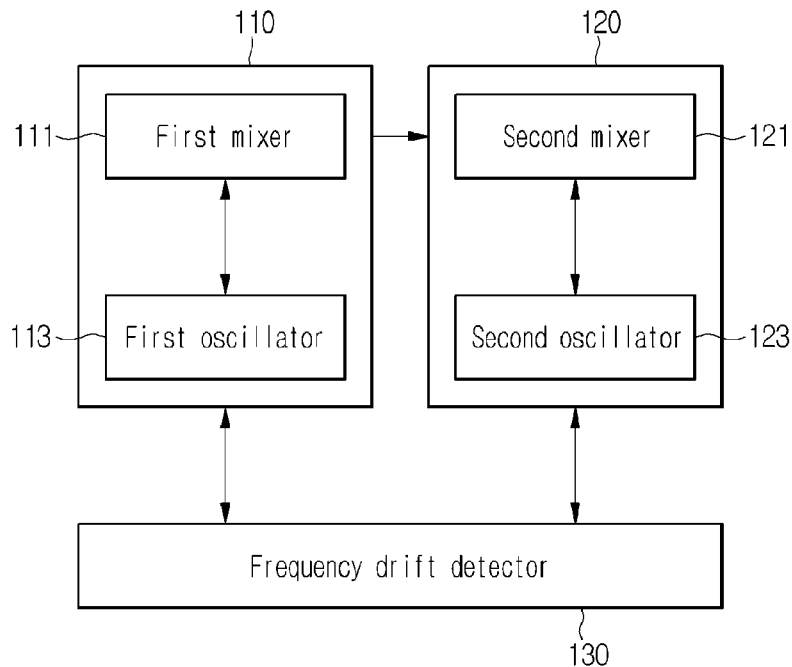
[Fig. 2]
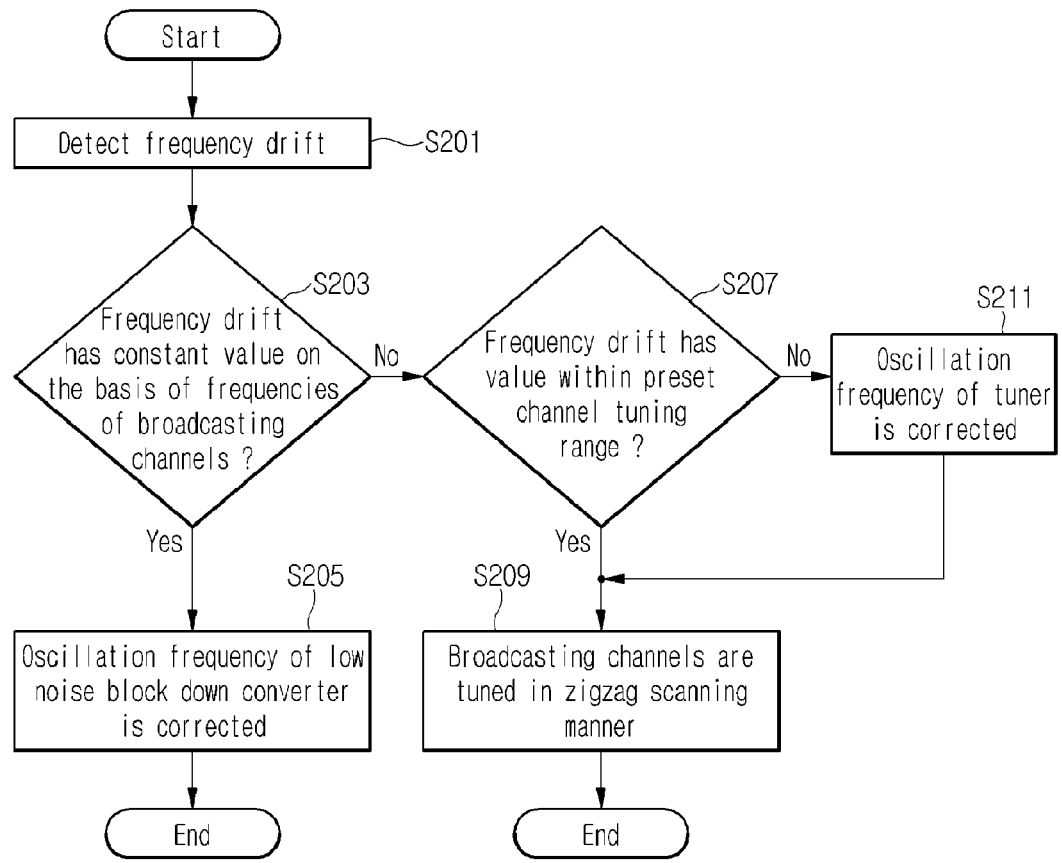

BROADCASTING RECEIVER AND OPERATING METHOD THEREOF

CROSS-REFERENCE TO RELATED APPLICATION

This application is the U.S. national stage application of International Patent Application No. PCT/KR2008/000333, filed Jan. 18, 2008, the disclosure of which is hereby incorporated by reference in its entirety.

TECHNICAL FIELD

The embodiment relates to a broadcasting receiver and an operating method thereof.

BACKGROUND ART

A broadcasting receiver amplifies high frequency signals, which are received through an antenna, by using a low noise block down converter and provides the amplified high frequency signals to a tuner. The tuner converts the input high frequency signals to signals having a predetermined intermediate frequency and outputs the converted signals.

However, while the signals are being transmitted from the transmission side to the reception side, the frequency of the signals may be varied. In particular, an error may occur between the transmitted frequency and the received frequency due to increase in the number of satellites, noise of adjacent channels, distortion and attenuation in a transmitter and a receiver and the like. Further, frequency distortion may occur between transmitted signals and received signals due to the deterioration and abnormal operation of the low noise block down converter in the broadcasting receiver.

As described above, while the signals are being transmitted from the transmission side to the reception side, the signals may be distorted and the frequency drifts may occur. When the frequency drifts occur, the receiver sensitivity may deteriorate.

DISCLOSURE OF INVENTION

Technical Problem

The embodiment provides a broadcasting receiver capable of improving the receiver sensitivity by tuning broadcasting channels after detecting frequency drifts and correcting an oscillation frequency, and an operating method thereof.

Technical Solution

A broadcasting receiver according to the embodiment comprises: a low noise block down converter outputting a signal by amplifying a received signal; a tuner tuning a plurality of broadcasting channels based on the signals output from the low noise block down converter; and a frequency drift detector detecting frequency drifts of the broadcasting channels tuned by the tuner, and correcting oscillation frequencies of at least one of the low noise block down converter and the tuner.

A method for operating a broadcasting receiver according to the embodiment comprises: outputting a signal by amplifying a received signal using a low noise block down converter; tuning a plurality of broadcasting channels by using a tuner based on the signals output from the low noise block down converter; and detecting frequency drifts of the broadcasting channels tuned by the tuner, and correcting oscillation frequencies of at least one of the low noise block down converter and the tuner.

Advantageous Effects

According to the broadcasting receiver and the operating method thereof of the embodiment, broadcasting channels are tuned after frequency drifts are detected and an oscillation frequency is corrected, so that the receiver sensitivity can be improved.

BRIEF DESCRIPTION OF THE DRAWINGS

FIG. 1 is a block diagram showing a broadcasting receiver according to an embodiment; and FIG. 2 is a flowchart illustrating a method for operating a broadcasting receiver according to an embodiment.

MODE FOR THE INVENTION

Hereinafter, an embodiment will be described with reference to the accompanying drawings.

FIG. 1 is a block diagram showing a broadcasting receiver according to the embodiment.

As shown in FIG. 1, the broadcasting receiver according to the embodiment comprises a low noise block down converter 110, a tuner 120 and a frequency drift detector 130.

The low noise block down converter 110 comprises a first mixer 111 and a first oscillator 113. The first oscillator 113 provides the first mixer 111 with an oscillation frequency. The first mixer 111 outputs carrier signals using the oscillation frequency provided from the first oscillator 113. For example, the low noise block down converter 110 amplifies the gain of satellite broadcasting signals having a high frequency, which are input through an antenna, and then converts the high frequency to a carrier frequency for output.

The tuner 120 comprises a second mixer 121 and a second oscillator 123. The second oscillator 123 provides the second mixer 121 with an oscillation frequency. The second mixer 121 outputs intermediate frequency signals using the oscillation frequency provided from the second oscillator 123. The tuner 120 can further comprise an amplifier. The amplifier can amplify the signals, which are output from the low noise block down converter 110, to automatic gain control signals, and output the automatic gain control signals. The tuner 120 can tune a plurality of broadcasting channels based on the signals output from the low noise block down converter 110.

The frequency drift detector 130 detects frequency drifts in the broadcasting channels tuned by the tuner 120. The frequency drift detector 130 corrects the oscillation frequency of the low noise block down converter 110 or the tuner 120 with reference to the detected frequency drifts. For example, the frequency drift detector 130 may be provided in a CPU (central processing unit). Further, the frequency drift detector 130 may also be prepared in the form of an additional controller.

The oscillation frequency of the low noise block down converter 110 can be corrected under the control of the first oscillator 113. When the frequency drift detected in each broadcasting channel has a constant value on the basis of the frequency of each broadcasting channel, the oscillation frequency of the low noise block down converter 110 can be corrected according to the value of the detected frequency drift.

For example, in a case in which channels A, B and C can be tuned, the frequency drifts detected in the channels A, B and C can have the same value f. In such a case, the oscillation frequency of the low noise block down converter 110 can be corrected by the value f in consideration of the detected frequency drift.

As described above, the oscillation frequency of the low noise block down converter 110 is corrected, so that the receiver sensitivity can be improved. Since the frequency drift detected in each broadcasting channel has a constant value, such a correction for the oscillation frequency of the low noise block down converter 110 may exert influence upon all broadcasting channels.

The oscillation frequency of the tuner 120 can be corrected under the control of the second oscillator 123. When the frequency drift detected in each broadcasting channel has values, which deviate from the preset channel tuning range on the basis of the frequency of each broadcasting channel, the oscillation frequency of the tuner 120 can be corrected.

For example, in a case in which channels A, B and C can be tuned, the frequency drifts detected in the channels A, B and C can have different values f1, f2 and f3, respectively. In such a case, when the values f1, f2 and f3 deviate from the preset channel tuning range f0, the oscillation frequency of the tuner 120 is corrected. In detail, the oscillation frequency for the channel A can be corrected by f1, the oscillation frequency for the channel B can be corrected by f2, and the oscillation frequency for the channel C can be corrected by f3. Further, the oscillation frequencies corrected for each channel may have various values, and the oscillation frequencies for each channel can be corrected, respectively, such that frequency drifts detected in all channels can belong to the preset channel tuning range f0.

As described above, the oscillation frequency of the tuner 120 is corrected, so that the receiver sensitivity can be improved. That is, since the frequency drift detected in said each broadcasting channel does not have a constant value, the oscillation frequency is corrected in said each broadcasting channel through the correction for the oscillation frequency of the tuner 120.

The method for operating the broadcasting receiver according to the embodiment will be described with reference to FIGS. 1 and 2. FIG. 2 is a flowchart illustrating the method for operating the broadcasting receiver according to the embodiment.

The low noise block down converter 110 outputs received signals by amplifying the received signals. The tuner 120 tunes a plurality of broadcasting channels based on the signals output from the low noise block down converter 110. The frequency drift detector 130 detects frequency drifts in the broadcasting channels tuned by the tuner 120 (S201).

The frequency drift detector 130 detects frequency distortion in the low noise block down converter 110, and the frequency drifts caused by frequency shifts generated on the broadcasting channels. The frequency drifts can be detected using the difference between the reference frequency of a broadcasting channel and a frequency actually tuned by the tuner 120.

Then, the frequency drift detected by the frequency drift detector 130 has a constant value on the basis of the frequency of each broadcasting channel (S203).

As a result of the determination in step 203, when the detected frequency drift has a constant value on the basis of the frequency of each broadcasting channel, step 205 is performed. That is, the oscillation frequency of the low noise block down converter 110 is corrected according to the value of the detected frequency drift. The oscillation frequency of the low noise block down converter 110 can be corrected under the control of the first oscillator 113.

For example, in a case in which channels A, B and C can be tuned, the frequency drifts detected in the channels A, B and C can have the same value f. In such a case, the oscillation frequency of the low noise block down converter 110 can be corrected by the value f in consideration of the detected frequency drift.

As described above, the oscillation frequency of the low noise block down converter 110 is corrected, so that the receiver sensitivity can be improved. Since the frequency drift detected in each broadcasting channel has a constant value, such a correction for the oscillation frequency of the low noise block down converter 110 may exert influence upon all broadcasting channels.

As a result of the determination in step 203, when the detected frequency drift does not have a constant value on the basis of the frequency of the broadcasting channel, step 207 is performed. That is, it is determined whether the detected frequency drift has values within the preset channel tuning range (S207).

As a result of the determination in step 207, when the detected frequency drift has the values within the preset channel tuning range, broadcasting channels are tuned in a zigzag scanning manner (S209). According to the zigzag scanning manner, broadcasting channels are scanned and tuned between a high frequency and a low frequency having bandwidths preset on the basis of a reference frequency.

When the detected frequency drift has the values within the preset channel tuning range, the oscillation frequency correction is not additionally performed relative to the low noise block down converter 110 or the tuner 120. This is because the broadcasting channels are tuned in the zigzag scanning manner, so that the broadcasting channels are not affected by the frequency drifts.

As a result of the determination in step 207, when the detected frequency drift does not have values within the preset channel tuning range, the oscillation frequency of the tuner 120 is corrected according to the value of the detected frequency drift (S211). The oscillation frequency of the tuner 120 can be corrected under the control of the second oscillator 123.

That is, since the frequency drift detected in said each broadcasting channel does not have a constant value, the oscillation frequency is corrected in each broadcasting channel through the correction for the oscillation frequency of the tuner 120.

For example, in a case in which channels A, B and C can be tuned, the frequency drifts detected in the channels A, B and C can have different values f1, f2 and f3, respectively. In such a case, when the values f1, f2 and f3 deviate from the preset channel tuning range f0, the oscillation frequency of the tuner 120 is corrected. In detail, the oscillation frequency for the channel A can be corrected by f1, the oscillation frequency for the channel B can be corrected by f2, and the oscillation frequency for the channel C can be corrected by f3. Further, the oscillation frequencies corrected for each channel may have various values, and the oscillation frequencies for each channel can be corrected, respectively, such that frequency drifts detected in all channels can belong to the preset channel tuning range f0.

Then, step 209 is performed. That is, the tuner 120 tunes broadcasting channels by using the corrected oscillation frequency in the zigzag scanning manner. The oscillation frequency of the tuner 120 is corrected as described above, so that the receiver sensitivity can be improved.

Any reference in this specification to "one embodiment", "an embodiment", "example embodiment", etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the broadcasting receiver and the operating method thereof of the embodiment, the broadcasting channels are tuned after the frequency drifts are detected and the oscillation frequency is corrected, so that the receiver sensitivity can be improved.

The invention claimed is:

1. A broadcasting receiver comprising:
    a low noise block down converter outputting a signal by amplifying a received signal;
    a tuner tuning a plurality of broadcasting channels based on the signals output from the low noise block down converter; and
    a frequency drift detector detecting frequency drifts of the broadcasting channels tuned by the tuner, and correcting oscillation frequencies of at least one of the low noise block down converter and the tuner,
    wherein the tuner comprises an oscillator providing an oscillation frequency and a mixer outputting intermediate frequency signals using the oscillation frequency provided from the tuner's oscillator.

2. The broadcasting receiver as claimed in claim 1, wherein the low noise block down converter comprises an oscillator providing an oscillation frequency, and a mixer outputting carrier signals using the oscillation frequency, provided from the down converter's oscillator.

3. The broadcasting receiver as claimed in claim 1, wherein, when the frequency drift detected in each broadcasting channel has a constant value on a basis of frequency of each broadcasting channel, the oscillation frequency of the low noise block down converter is corrected according to the value of the detected frequency drift.

4. The broadcasting receiver as claimed in claim 1, wherein, when the frequency drift detected in each broadcasting channels does not have a constant value, and have values within a preset channel tuning range on a basis of frequency of each broadcasting channel, the broadcasting channels are tuned in a zigzag scanning manner.

5. The broadcasting receiver as claimed in claim 1, wherein, when the frequency drift detected in each broadcasting channel does not have a constant value, and does not have values within a preset channel tuning range on a basis of frequency of each broadcasting channel, the oscillation frequency of the tuner is corrected according to a value of the detected frequency drift.

6. The broadcasting receiver as claimed in claim 5, wherein the tuner tunes broadcasting channels using the corrected oscillation frequency in a zigzag scanning manner.

7. A method for operating a broadcasting receiver, the method comprising:
    outputting a signal by amplifying a received signal using a low noise block down converter;
    tuning a plurality of broadcasting channels by using a tuner based on the signals output from the low noise block down converter; and
    detecting frequency drifts of the broadcasting channels tuned by the tuner, and correcting oscillation frequencies of at least one of the low noise block down converter and the tuner,
    wherein the tuner comprises an oscillator and a mixer, an oscillation frequency is provided by the tuner's oscillator, and intermediate frequency signals are output from the tuner's mixer using the provided oscillation frequency.

8. The method as claimed in claim 7, wherein the low noise block down converter comprises an oscillator and a mixer, an oscillation frequency is provided by the down converter's oscillator, and carrier signals are output from the down converter's mixer using the provided oscillation frequency.

9. The method as claimed in claim 7, wherein, when the frequency drift detected in each broadcasting channel has a constant value on a basis of frequency of each broadcasting channel, the oscillation frequency of the low noise block down converter is corrected according to a value of the detected frequency drift.

10. The method as claimed in claim 7, wherein, when the frequency drift detected in each broadcasting channel does not have a constant value, and have values within a preset channel tuning range on a basis of frequency of each broadcasting channel, the broadcasting channels are tuned in a zigzag scanning manner.

11. The method as claimed in claim 7, wherein, when the frequency drift detected in each broadcasting channel does not have a constant value, and does not have values within a preset channel tuning range on a basis of frequency of each broadcasting channel, the oscillation frequency of the tuner is corrected according to a value of the detected frequency drift.

12. The method as claimed in claim 11, wherein broadcasting channels are tuned by the tuner using the corrected oscillation frequency in a zigzag scanning manner.

* * * * *